March 8, 1966 W. R. DANCE ETAL 3,239,259
BALL AND SOCKET JOINT
Original Filed Oct. 2, 1961 2 Sheets-Sheet 1
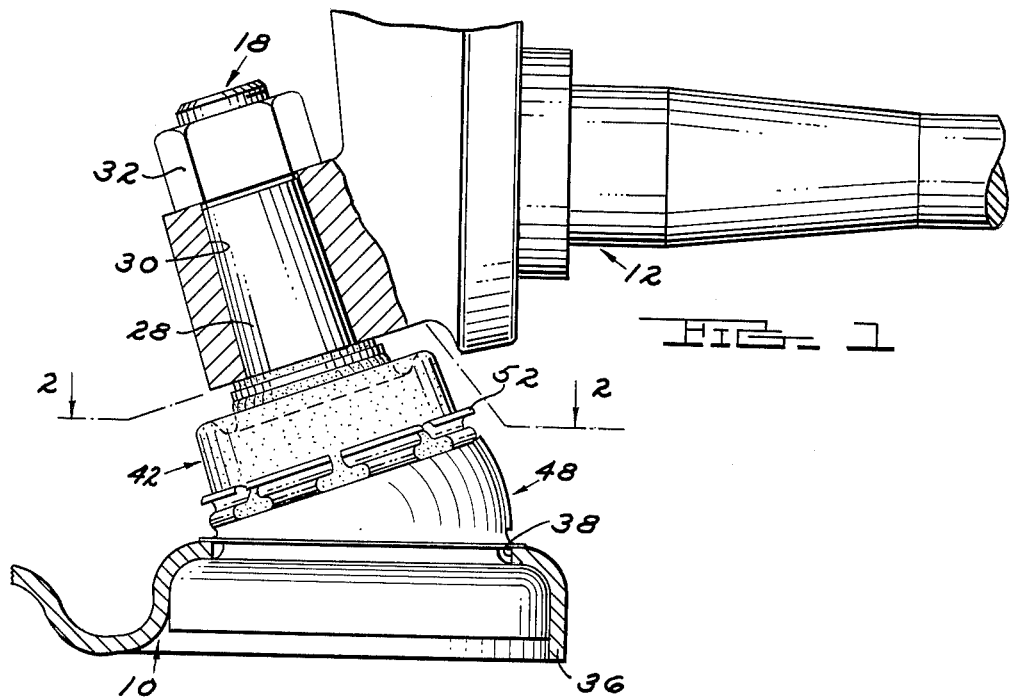
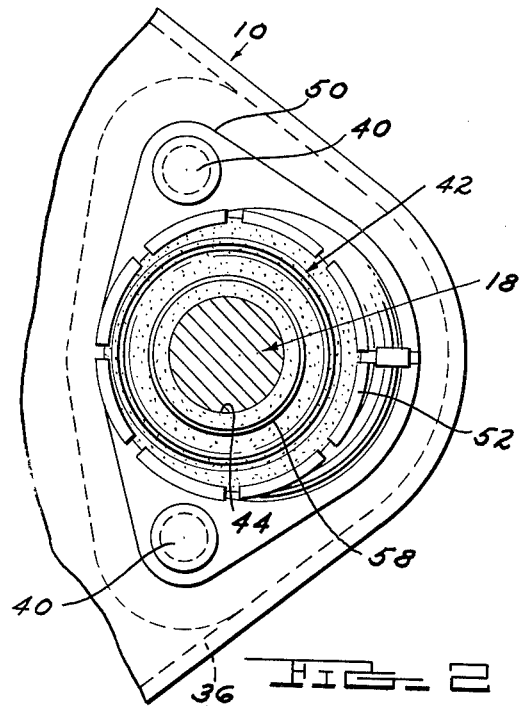
CHARLES L. KNIGHTON
WENDELL R. DANCE
INVENTORS
BY John R. Faulkner
Clifford L. Sadler
ATTORNEYS

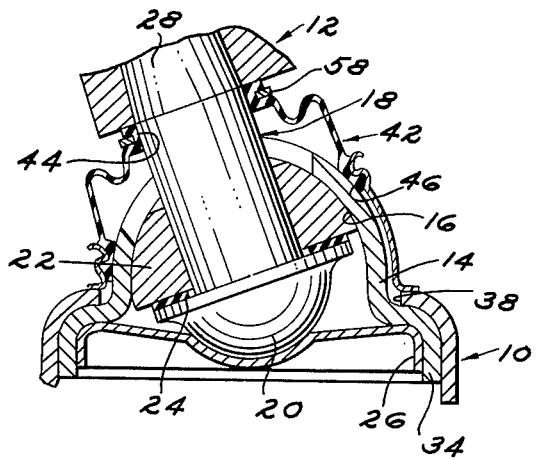
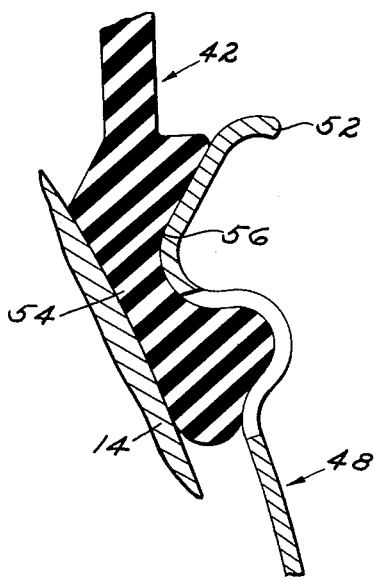
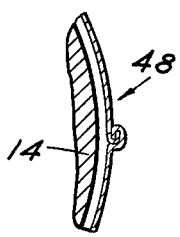

United States Patent Office 3,239,259
Patented Mar. 8, 1966

3,239,259
BALL AND SOCKET JOINT
Wendell R. Dance, Plymouth Township, and Charles L. Knighten, Birmingham, Mich., assignors to Ford Motor Company, Dearborn, Mich., a corporation of Delaware
Continuation of application Ser. No. 142,106, Oct. 2, 1961. This application Nov. 9, 1964, Ser. No. 436,707
2 Claims. (Cl. 287—87)

This application is a continuation of our earlier filed application Serial Number 142,106 filed October 2, 1961 and now abandoned.

The present invention relates to ball and socket type joints and more particularly to means for sealing such constructions.

Ball and socket joints provide an articulated connection between two relatively movable members. It is common practice to provide such ball joints in vehicle suspension systems such as where the suspension arms connect with the wheel spindle. Ball joints are also used in the steering linkage.

A ball joint usually comprises a spherical or semi-spherical socket and a stud with a one- or two-piece spherical head that is seated in the socket. The joints are lubricated with grease to permit low friction movement and in order to retain the lubricant within the socket and prevent the entry of dirt that might damage the bearing surfaces, a boot type seal is usually provided. A boot seal is usually formed of a flexible material such as rubber in an annular shape with a small opening at one end surrounding the stud and a large opening surrounding the socket. It is conventional practice to provide reinforcing rings at both openings in order to retain the seal in position.

In automotive suspension systems it has become an objective to provide prelubricated ball and socket joints containing a grease of improved quality that will retain good lubricating characteristics for extended usuage beyond the heretofore conventional 1,000 mile servicing. In order to accommodate a ball joint construction having such improved lubrication, improved means must be provided to retain the grease and to prevent its contamination.

In accordance with this need, it is an object of the present invention to provide a boot type seal for a ball joint having superior sealing characteristics.

It is a further object of this invention to provide such a joint seal with retention means for maintaining the seal in tight contact with the socket of the joint but to permit its easy removal and replacement when necessary.

In one specific embodiment of the present invention, a joint having a spherical socket and a stud seated in the socket is provided with a sheet metal seal retainer affixed to the socket. The retainer has a series of spring tabs to engage an enlarged lip provided at the periphery of one of the openings of the joint seal.

These and further objects of the present invention will be more fully comprehended from the following discussion and the accompanying drawings, in which:

FIGURE 1 is an elevational view partly in section of a portion of a vehicle suspension system having a ball joint and seal constructed in accordance with this invention;

FIGURE 2 is a sectional view taken along lines 2—2 of FIGURE 1;

FIGURE 3 is an elevational view in section corresponding to a portion of FIGURE 1 with the internal construction of the ball joint disclosed;

FIGURE 4 is an enlarged elevational view showing the engagement of the joint seal with the seal retainer; and, FIGURE 5 is an enlarged view showing a portion of the construction of the seal retainer.

Referring now to the drawings wherein like reference numerals identify like parts throughout the various views, FIGURE 1 discloses a portion of a vehicle suspension having a ball joint and seal construction showing the presently preferred embodiment of this invention. In that view, a suspension arm 10, such as the lower arm of an independent suspension system, is shown connected to a wheel spindle 12 by means of a ball joint, the internal construction of which is best seen in FIGURE 3.

The ball joint has a socket 14 with an internal hemispherical head bearing surface 16. A stud 18 having a hemispherical head 20 is positioned within the socket 14. An annular bearing member 22 is located about the stud 18 and has an external bearing surface in sliding engagement with the hemispherical bearing surface 16 of the socket 14. A washer-shape ring 24 formed of a low friction material such as Teflon is interposed between the annular bearing member 22 and the head 20 of the stud 18. The lower end of the socket 14 is encased by a closure member 26 of stamped sheet metal.

The upper end of the stud 18 is tapered as at 28 and is received within a tapered bore 30 provided in the spindle 12. A nut 32 threaded on the end of stud 18 secures its tapered shank in position.

The socket 14 of the ball joint is provided with a depending flange 34. This flange 34 permits the socket 14 to nest within the outer end of the arm 10 by means of a complementary depending flange 36 formed therein. An opening 38 is formed in the arm 10 and the socket 14 and stud 18 protrude therethrough. The socket member 14 is retained rigidly by a pair of rivets 40 within the socket like construction formed by the flange 36.

A boot type rubber seal 42 having a generally annular shape is positioned concentrically about the shank of the stud 18 and has a small upper opening 44 in sealed engagement with both the stud 18 and the spindle 12. An enlarged lower opening 46 in the seal 42 is in tight contact with the external surface of the socket 14. A spring metal seal retainer 48 maintains the seal 42 about the socket 14. The enclosed volume defined by the socket 14, the closure 26 and the boot seal 42 is filled with a lubricant.

The seal retainer 48 has a semi-spherical portion that surrounds the socket 14. A pair of flanges 50 extend from the body of the retainer 48 and are permanently secured by the rivets 40 when the ball joint assembly is affixed to the suspension arm 10. The upper end of the retainer 48 is castellated to form a circumferential series of spaced apart spring metal tabs 52. The tabs 52 engage an enlarged lip 54 formed on the lower end of the boot seal 42. It will be noted in FIGURE 4 that the lip 54 has an external groove 56 formed therein. The spring metal tabs 52 are provided with a complementary contour to fit within the groove 56.

The engagement of the series of tabs 52 with the lip 54 of the seal 42 insures a sealing contact with the socket 14 to prevent the entry of contaminants or expulsion of lubricants. Regardless of the articulation of the ball joint assembly, the seal 42 is locked onto the external surface of the socket 14 by the engagement of the tabs 52 and lip 54. In addition to securing the seal 42 in position, the springiness of the tabs 52 of the retainer permit easy disassembly.

The smaller upper opening 44 of the seal 42 is constrained in position about the shank of the stud 18 by an annular reinforcing ring 58 made of nylon.

The retainer 48 is stamped from flat spring metal stock. FIGURE 5 indicates a portion of the construction and the manner in which the piece is formed by crimping together adjacent ends.

The foregoing description presents the presently preferred embodiment of this invention. The invention provides a superior ball joint and seal construction that is particularly adapted to retain lubricants. The seal is easily installed and removed as occasion may demand. Modifications and alterations may occur to those skilled in the art that will come within the scope and spirit of the following claims.

I claim:
1. A ball and socket type joint having a socket and a tiltable stud protruding from said socket, an enlarged flexible boat seal having axially spaced apart first and second openings, the periphery of said first opening being in sealed engagement about said stud, the periphery of said second opening being in sealed engagement about said socket, a spring metal retainer rigidly secured to said socket at one end and having a series of upstanding flexible spring fingers about its circumference at its other end adapted to detachably secure said second periphery to said socket, an enlarged rib formed at said second periphery and held against the outside surface of the socket by said spring fingers, said fingers being formed to complement the exterior configuration of said rib and having end portions extending radially outwardly to permit said seal to be snapped into and out of engagement with said socket while said retainer remains rigidly secured to said socket.

2. The combination of claim 1 wherein said spring metal retainer is secured to said socket by rivets.

References Cited by the Examiner
UNITED STATES PATENTS

| | | |
|---|---|---|
| 1,173,211 | 2/1916 | O'Donnell _____ 285—45 X |
| 2,264,728 | 12/1941 | Stillwagon. |
| 2,274,418 | 2/1942 | Katcher. |
| 2,926,938 | 3/1960 | Ratti _____ 277—186 |
| 3,017,196 | 1/1962 | McFarland _____ 287—87 X |
| 3,024,050 | 3/1962 | Moskovitz. |
| 3,052,477 | 9/1962 | Parker. |
| 3,073,617 | 1/1963 | Schultz. |
| 3,086,800 | 4/1963 | Runyon. |

CARL W. TOMLIN, *Primary Examiner.*